Patented Oct. 25, 1932

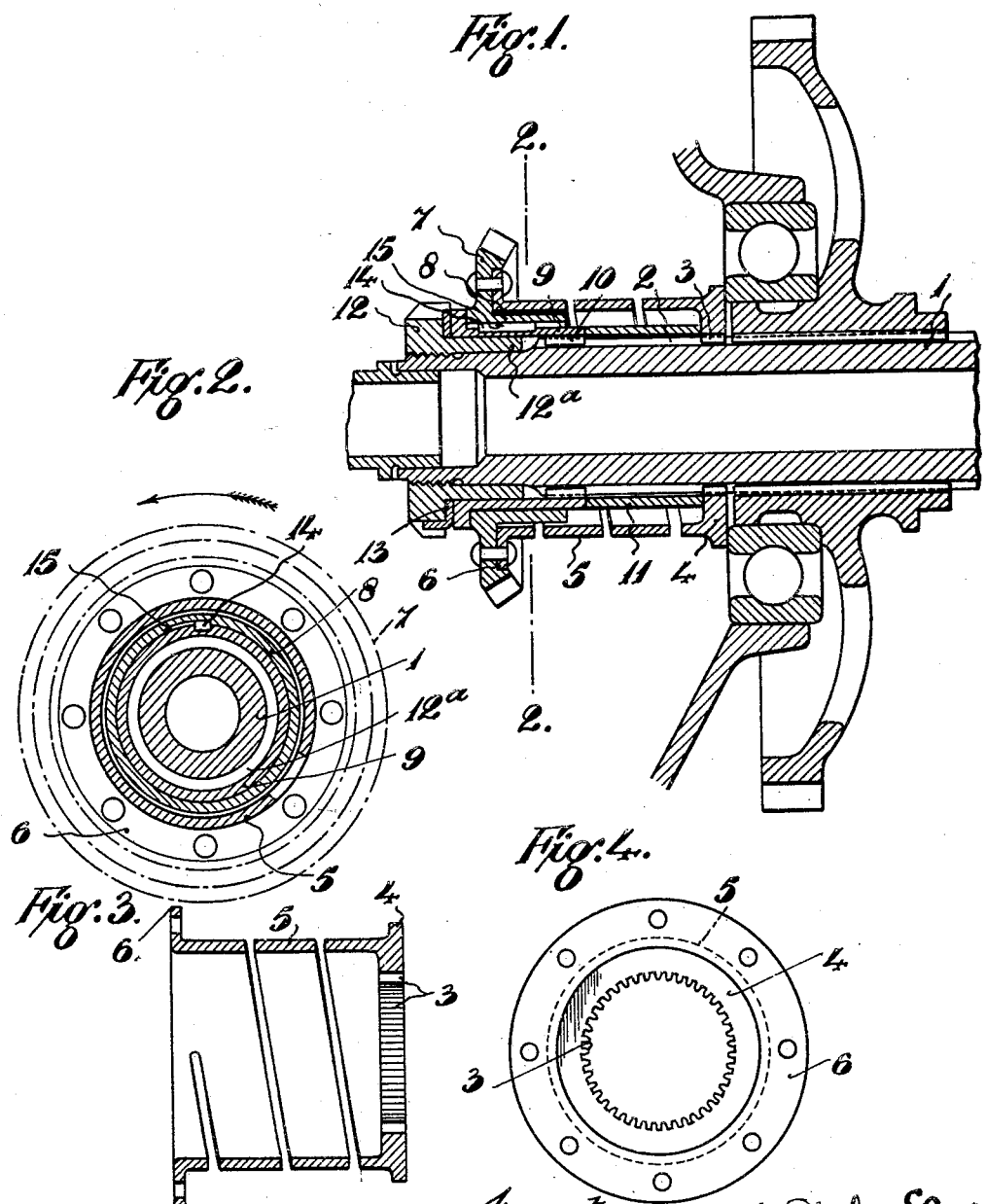

1,884,029

UNITED STATES PATENT OFFICE

EDWARD STEPHEN LUYKS, OF BIRMINGHAM, ENGLAND, ASSIGNOR TO WOLSELEY MOTORS 1927 LIMITED, OF BIRMINGHAM, ENGLAND

SPRING DRIVE OR COUPLING FOR THE TRANSMISSION OF POWER

Application filed April 2, 1931, Serial No. 527,152, and in Great Britain July 18, 1930.

This invention relates to spring drives or couplings employed for the transmission of power from a driving shaft or member to a driven shaft or member with a view to avoiding the transfer of shocks from the one member to the other due to irregular running of the driving member, such spring drives or couplings being used, for example, in connection with the driving of magnetos and other auxiliary parts of internal combustion engines.

The object of the present invention is to provide an improved and more efficient form of spring drive having provision whereby the resistance or resiliency may be readily adjusted.

According to the invention the improved spring drive comprises a spring element, preferably under torsional stress, one end of which is in direct driving connection with the driving member, while the other end is connected to a driven member which has a lost-motion connection with the driving member, so that a limited relative rotary motion between the driving and driven members, governed by the spring element, is permitted. To allow of readily adjusting the torsion of the spring element the driving end thereof and a part carrying an inner member of the lost-motion device, are coupled to a driving shaft in such a manner that their relative angular relationship can be varied. Thus, the driving shaft may be splined or serrated, the driving end of the spring being carried by an internally toothed or serrated ring adapted to engage the splines or serrations of the shaft, and the part carrying the inner member of the lost-motion device being also internally toothed or serrated to engage the shaft splines or serrations, so that the said internally toothed parts can be engaged with the shaft in different angular positions relatively to one another.

Figure 1 of the accompanying drawing represents a longitudinal section through a spring drive constructed in accordance with this invention and particularly intended for driving a magneto or other auxiliary part of an internal combustion engine.

Figure 2 shows a cross-section on the line 2—2, Figure 1.

Figure 3 is a separate sectional view of the spring sleeve through which the drive is transmitted.

Figure 4 shows an end view of the said sleeve.

Referring to the drawing the driving shaft 1 is provided with longitudinal splines or serrations 2 which are engaged by internal teeth or serrations 3 of a ring or flange 4 at the one end of a helically-coiled spring sleeve 5 surrounding the shaft 1 co-axially therewith, the other end of the spring sleeve 5 having a flange or ring 6 attached to a driven gear-wheel 7 of the bevel, spur or other type, from which the drive is transmitted to the magneto or other auxiliary through the medium of another gear or gears. The said driven gear-wheel 7 has an extended cylindrical boss 8 which may pass a short distance into the spring 5, and which is rotatably mounted upon a bearing sleeve 9 having at its inner end, upon its interior periphery, a ring of teeth or serrations 10 adapted to engage and mate with the splines or serrations 2 of the shaft 1. A distance sleeve 11 surrounds the shaft 1 between the toothed bearing sleeve 9 and the toothed ring 4 at the driving end of the spring, in order to space these members at the correct distance apart. The said toothed bearing sleeve 9 is supported, outwards of the teeth 10, upon a cylindrical extension 12$^a$ of a nut 12 screwed upon the shaft 1 in order to secure the parts in position thereon, the said nut being locked by any suitable means, such as by a locking plate 13 having tongues bent over to engage castellations of the nut. The above described toothed bearing sleeve 9 supporting the gear-wheel 7 carries upon its outer surface a key or other projection 14 which engages with a keyway or slot 15 (Figure 2) cut in the boss 8 of the said gear-wheel, the slot 15 being wider than the key 14 in the circumferential direction, so as to form a lost-motion connection, leaving the gear-wheel 7 free to turn within a limited angle in relation to the bearing sleeve 9.

When the parts are assembled the spring sleeve 5 has an initial torsional stress such that the one end of the keyway 15 of the gear-wheel 7 is held, by the torsion of the said spring sleeve, in contact with one side of the key 14 in the bearing sleeve, namely, with that side which faces the direction opposite to that of rotation, as shown in Figure 2. Thus, should the rotation of the shaft 1 be momentarily accelerated and the resistance in the drive correspondingly increased, the key 14 would tend to leave that side of the slot with which it is normally in contact, a certain amount of relative angular motion, governed by the torsion of the spring sleeve 5 and limited by the key 14, accurring between the gear-wheel 7 and the bearing sleeve 9.

To adjust the torsion of the spring sleeve 5 constituting the resilient member, the parts are removed from the shaft 1, and the gear-wheel 7 and spring sleeve 5 are replaced thereon in a different angular relationship thereto compared with the previous position, the splines or serrations of the shaft 1 readily permitting this to be done. The bearing sleeve 9 is replaced in its original angular relationship to the shaft 1, and in order to engage with the key 14 in the bearing sleeve the gear-wheel 7 must be turned through a greater or lesser angle than before, thus increasing or decreasing the torsion in the spring sleeve.

Having fully described my invention, what I desire to claim and secure by Letters Patent is:—

1. A spring coupling for the transmission of power, comprising a driving shaft, a driven member, a spring element, initially under torsional stress, one end of which is connected with the driving shaft while the other end is connected to the driven member, an inner sleeve on the driving shaft, a lost-motion connection between the sleeve and the driven member, and means for coupling the inner sleeve to the driving shaft so that the angular relationship between the sleeve and the driving end of the spring element may be varied.

2. A spring coupling for the transmission of power, comprising a splined driving shaft, a driven member, an axially removable spring element, initially under torsional stress, the one end of which has internal teeth engaging the splines of the driving shaft while the other end is connected to the driven member, an axially removable inner sleeve having internal teeth engaging the splines of the driving shaft and a lost-motion connection between the sleeve and the driven member to permit of a limited relative rotary motion between the driving and driven members governed by the torsion of the spring element.

3. A spring coupling for the transmission of power, comprising a splined driving shaft, a driven member, an axially removable spring element having at one end internal teeth engaging the splines on the driving shaft, its other end being connected to the driven member, an axially removable inner sleeve formed with internal teeth engaging the splines on the driving shaft, means for axially retaining the said inner sleeve upon the driving shaft, and a lost-motion connection between the sleeve and the driven member to permit of a limited relative rotary motion between the driving and driven members governed by the torsion of the spring element.

4. A spring coupling for the transmission of power, comprising a driving shaft, a driven member, a spring element, initially under torsional stress, one end of which is connected with the driving shaft while the other end is connected to the driven member, an inner sleeve on the driving shaft, a lost-motion connection between the sleeve and the driven member comprising a projection on the one part engaging a recess in the other part, the said recess being wider than the projection in a circumferential direction, and means for coupling the inner sleeve and the spring element to the driving shaft so that the angular relationship between the sleeve and the driving end of the spring element may be varied.

5. A spring coupling for the transmission of power, comprising a splined driving shaft, a driven member, a spring element having at one end internal teeth engaging the splines on the driving shaft, its other end being connected to the driven member, an inner sleeve having internal teeth engaging the splines on the driving shaft, and a lost-motion connection between the sleeve and the driven member comprising a projection on the one part engaging a recess in the other part, the said recess being wider than the projection in a circumferential direction, to permit of a limited relative rotary motion between the driving and driven members governed by the torsion of the spring element.

6. A spring coupling for the transmission of power comprising a splined driving shaft, a driven member, a torsion spring element around the driving shaft having one end connected to the driven member and the other end provided with internal teeth removably engaged with the splines of the driving shaft, an inner sleeve having internal teeth removably engaged with the splines of the shaft, a projection of the inner sleeve engaging a circumferential recess in the boss of the driven member to provide a lost-motion device, and a nut on the shaft retaining the spring element and inner sleeve thereon and having an axial extension supporting the said inner sleeve.

In testimony whereof I have affixed my signature.

EDWARD STEPHEN LUYKS.